(12) United States Patent
Pfeuffer et al.

(10) Patent No.: US 6,299,660 B1
(45) Date of Patent: Oct. 9, 2001

(54) ACCORDION FILTER WITH A PROTECTIVE MASK

(75) Inventors: Peter Pfeuffer, Ketsch; Hans-Joachim Lippold, Berlin; Markus Fronhöfer, Karlsruhe; Hans Leibold, Ettlingen, all of (DE)

(73) Assignee: Firma Carl Freudenberg, Weinheim (DE)

( * ) Notice: Subject to any disclaimer, the term of this patent is extended or adjusted under 35 U.S.C. 154(b) by 250 days.

(21) Appl. No.: 08/785,437

(22) Filed: Jan. 17, 1997

(30) Foreign Application Priority Data

Jan. 20, 1996 (DE) ............................................. 196 01 978

(51) Int. Cl.$^7$ ............................. B01D 39/16; B01D 35/31
(52) U.S. Cl. ................................ 55/294; 55/497; 55/499; 55/500; 55/502
(58) Field of Search ..................... 55/497, 514, DIG. 31, 55/295, 296, 499, 500, 502, 294; 95/279, 280

(56) References Cited

U.S. PATENT DOCUMENTS

| | | | |
|---|---|---|---|
| 2,019,213 | * 10/1935 | Dahlman | 55/514 |
| 2,395,449 | * 2/1946 | Briggs | 55/497 |
| 2,895,174 | * 7/1959 | Hockett | 55/497 |
| 3,151,962 | * 10/1964 | O'Dell | 55/514 |
| 3,216,578 | * 11/1965 | Wright et al. | 55/497 |
| 4,678,578 | * 7/1987 | Nodes et al. | 55/497 |

FOREIGN PATENT DOCUMENTS

| | | | |
|---|---|---|---|
| 2137309 | 11/1798 | (DE) . | |
| 1367226 | 9/1974 | (GB) . | |
| 60-137454 | * 7/1985 | (JP) | 55/295 |
| 60-193518 | * 10/1985 | (JP) | 55/295 |
| 4267914 | * 9/1992 | (JP) | 55/497 |

\* cited by examiner

*Primary Examiner*—David A. Simmons
*Assistant Examiner*—Robert A. Hopkins
(74) *Attorney, Agent, or Firm*—Kenyon & Kenyon (57) ABSTRACT

A filter element that is able to be sealingly secured in position in a filter housing, comprising an accordion fold pack. The oncoming-flow side of accordion fold pack is covered by a latticed protective mask. The protective mask is sealingly joined to all fold backs of accordion fold pack on the clean-air side. In this manner, the fold edges are protected from damage during the periodic cleaning in the face of the back-blasted air used for that purpose.

16 Claims, 8 Drawing Sheets

ACCORDION FILTER WITH A PROTECTIVE MASK

BACKGROUND OF INVENTION

1. Field of the Invention

The invention relates to a filter element of the accordion fold pack type that can be sealingly secured in position in a filter housing.

2. Description of Related Art

Such a filter element is known from the German Patent 21 37 309. The filter element comprises an accordion fold block made of an impregnated filter-paper strip that is folded zigzagged, in the case of which a protective metal net is arranged in front of the accordion fold block in the air-filtering direction and is joined to the sealing frame. The metal screen grid is comparatively wide-meshed and—relative to the folds of the accordion fold block—is provided with rhombic meshes.

Methods for cleaning filter elements are known from the printed documents DE 43 43 160 and DE 44 34 625.

SUMMARY OF THE INVENTION

The problem underlying the invention is to further develop a filter element of the previously known type in such a way that it can be cleaned by compressed air repeatedly during its service life without damage to the accordion fold pack.

In accordance with the present invention, a filter element comprises an accordion fold pack wherein the flow-off side (i.e., the clean-air side) of the accordion fold pack is covered by a latticed protective mask (preferably having a lattice of slots) and the protective mask is sealingly joined to all of the fold backs of the accordion fold pack on the clean-air side. An advantage of this structural approach is that the delicate fold backs of the filter material of the accordion fold pack are protected from damage and destruction by the protective mask (which preferably consists of a tough material).

After being covered with dust during normal operation, the filter element is cleaned by compressed air blown into the filter element opposite to the air-filtering direction from the clean-air side of the filter element. This causes the dust accumulated during the use of the filter to be blown out from the filter element. Subsequently the filter element is again operated in the normal manner as a filter until reaching a specific pressure difference between the oncoming-flow side and the flow-off side, or until some other indication that there has been an amount of dust covering. The filter can then again be dedusted by compressed air. The sealing connection between the protective mask and the fold backs of the accordion fold pack is provided in order to avoid a loss of compressed air caused by leakage during the cleaning of the filter element and thereby to permit an efficient cleaning.

According to one embodiment, the slotted mask and the fold backs are cemented to one another. The sealing connection between the slotted mask and the fold backs is thereby easily and cost-effectively produced.

The width of the slots of the slotted mask is no greater than the width of the fold openings between the fold backs. The ratio of the width of the slots and the width of the fold openings amounts to 0.6 to 1, preferably 0.7 to 0.9. This refinement ensures that when the individual fold openings are acted upon, one after the other by compressed air, that only the individual fold opening, and not the adjacent fold openings, are acted upon by compressed air. Thus, the compressed air is concentrated in only one fold opening—the fold openings preferably being blown free individually, one after the other. Furthermore, with such an embodiment it is advantageous that, even given comparatively generous manufacturing tolerances of the accordion fold pack and/or the slotted mask, the slots are always arranged over the fold openings between the fold backs.

The slotted mask may be, for instance, a rustproof, metallic material. Since the slotted mask is mounted on the accordion fold pack on the clean-air side, corrosion of the slotted mask is minimized even during a long service life of the filter element.

According to another embodiment, the slotted mask may be a nonmetallic material, such as a woven fabric. In a further embodiment, the slotted mask may be, for example, polystyrene.

Preferably, the accordion fold pack and the slotted mask form a unit that can be preassembled, thus advantageously simplifying manufacture of the filter element. The unit which can be preassembled, including an accordion fold pack and a slotted mask, can be provided with a sealing device and subsequently inserted as a whole into a filter housing.

The slotted mask can be enclosed by a frame which completely covers the filter element. The slotted mask may advantageously extend over the frame of the filter element, so that a plane surface is formed, across which a cleaning rod passes.

In addition, the oncoming-flow side of the accordion fold pack can be covered by a further latticed protective mask that is sealingly joined to all fold backs of the accordion fold pack on the oncoming-flow side. The protective mask on the oncoming-flow side is constructed in correspondence to the protective mask on the clean-air side, and is joined to the accordion fold pack. An advantage of this approach is that it serves to mechanically stabilize and protect the filter element as a whole by shielding the delicate accordion fold pack from external contacts.

The filter element according to the invention may be used as a high efficiency submicron particulate air filter for gaseous media.

BRIEF DESCRIPTION OF THE DRAWINGS

An exemplary embodiment of the filter cartridge according to the invention is described more precisely with reference to the following figures, wherein.

DETAILED DESCRIPTION OF THE INVENTION

Figure 1:
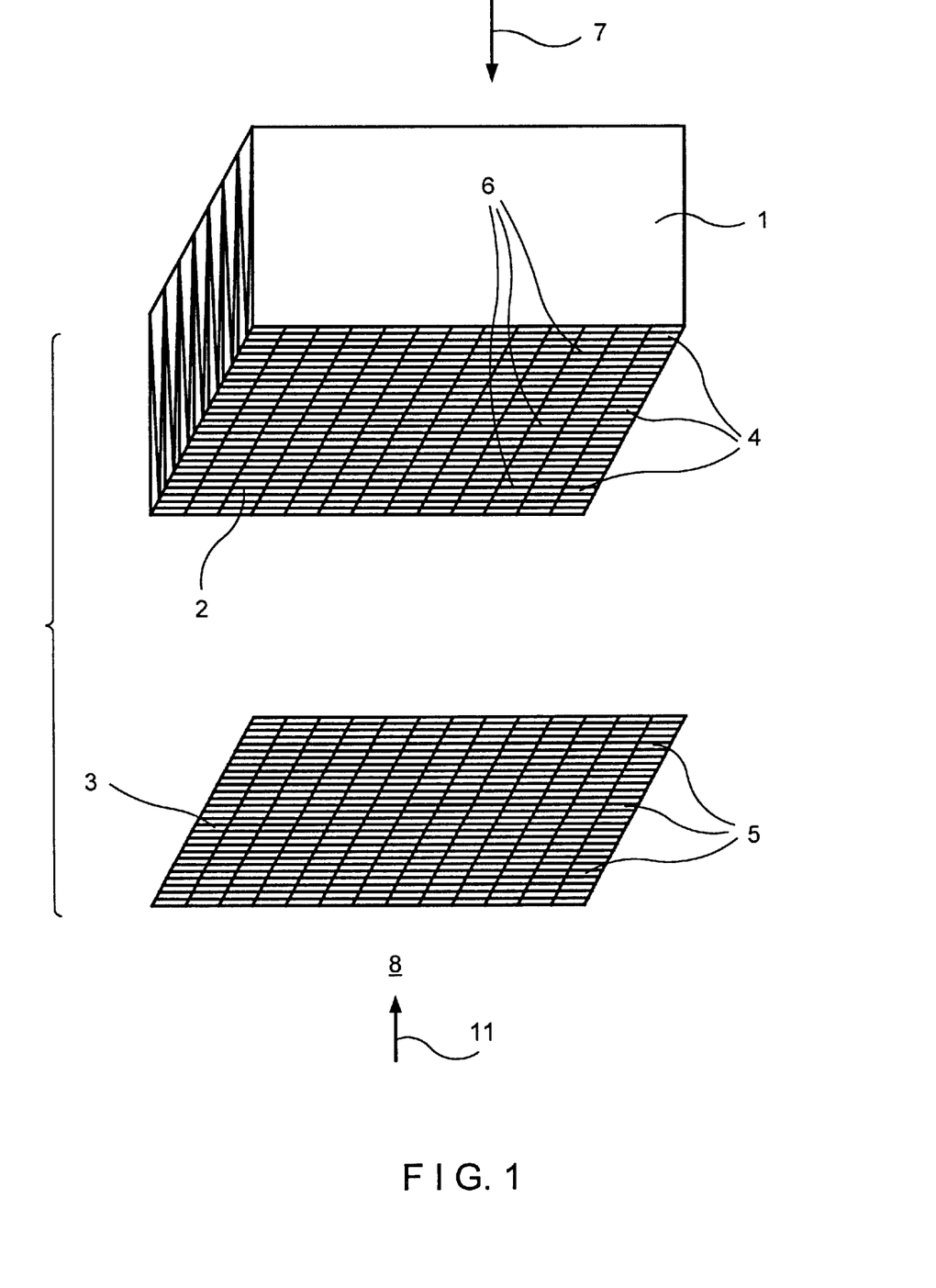
FIG. 1 is an exploded, perspective view in which the accordion fold pack and the slotted mask are shown separately from one another.

In FIG. 1, accordion fold pack 1 and slotted mask 3 are shown in perspective. Accordion fold pack 1 comprises a formed fabric and the slotted mask 3 comprises polystyrene of a thickness of 1 to 1.5 mm. Slotted mask 3 is arranged on flow-off side 2 of accordion fold pack 1 and has a geometry which is adapted to the folds of accordion fold pack 1. Fold backs 4 are arranged between fold openings 6, the fold backs each being cemented sealingly to slotted mask 3. The air-filtering direction is indicated by reference number 7. The clean-air side of the filter element is indicated by reference number 8.

Figure 2:
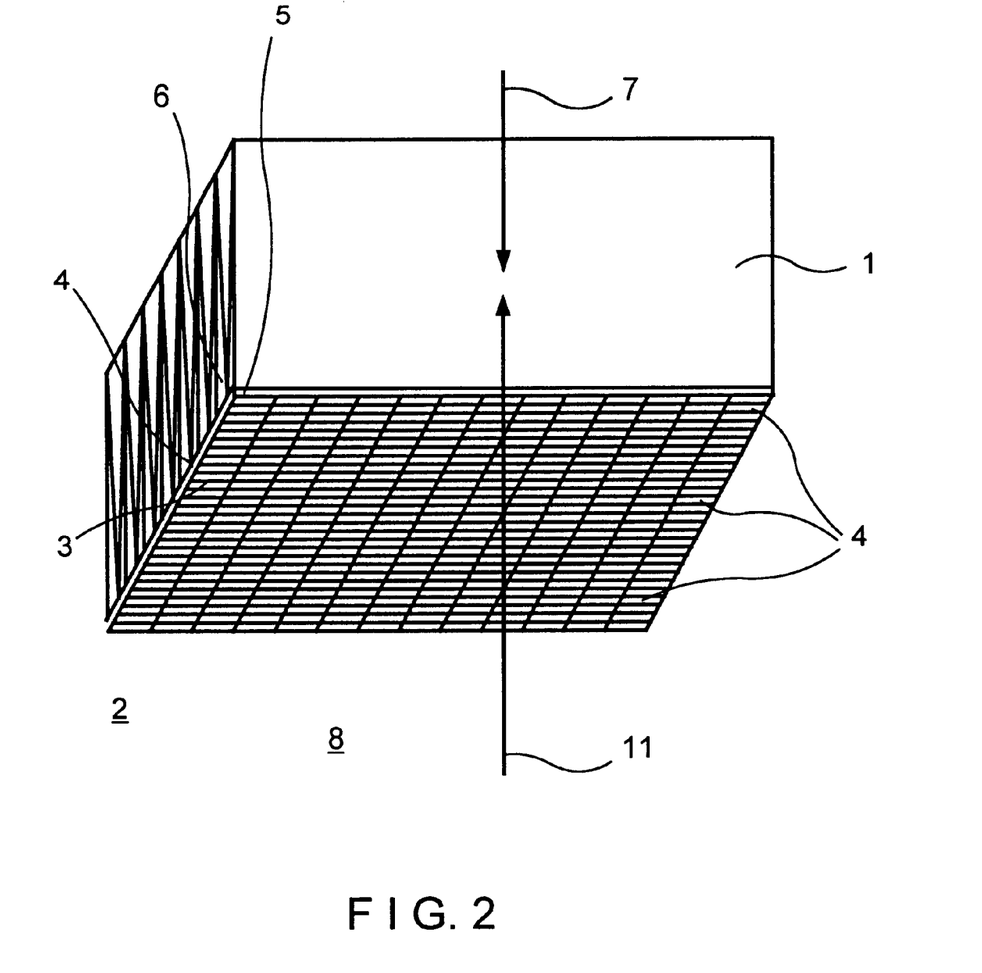
FIG. 2 is a perspective view of the preassembled unit, consisting of the accordion fold pack and the slotted mask of FIG. 1, in the joined state.

FIG. 2 shows the preassembled unit comprising accordion fold pack 1 and slotted mask 3. Slotted mask 3 is arranged on the side of the filter element facing clean-air side 8.

Figure 3:
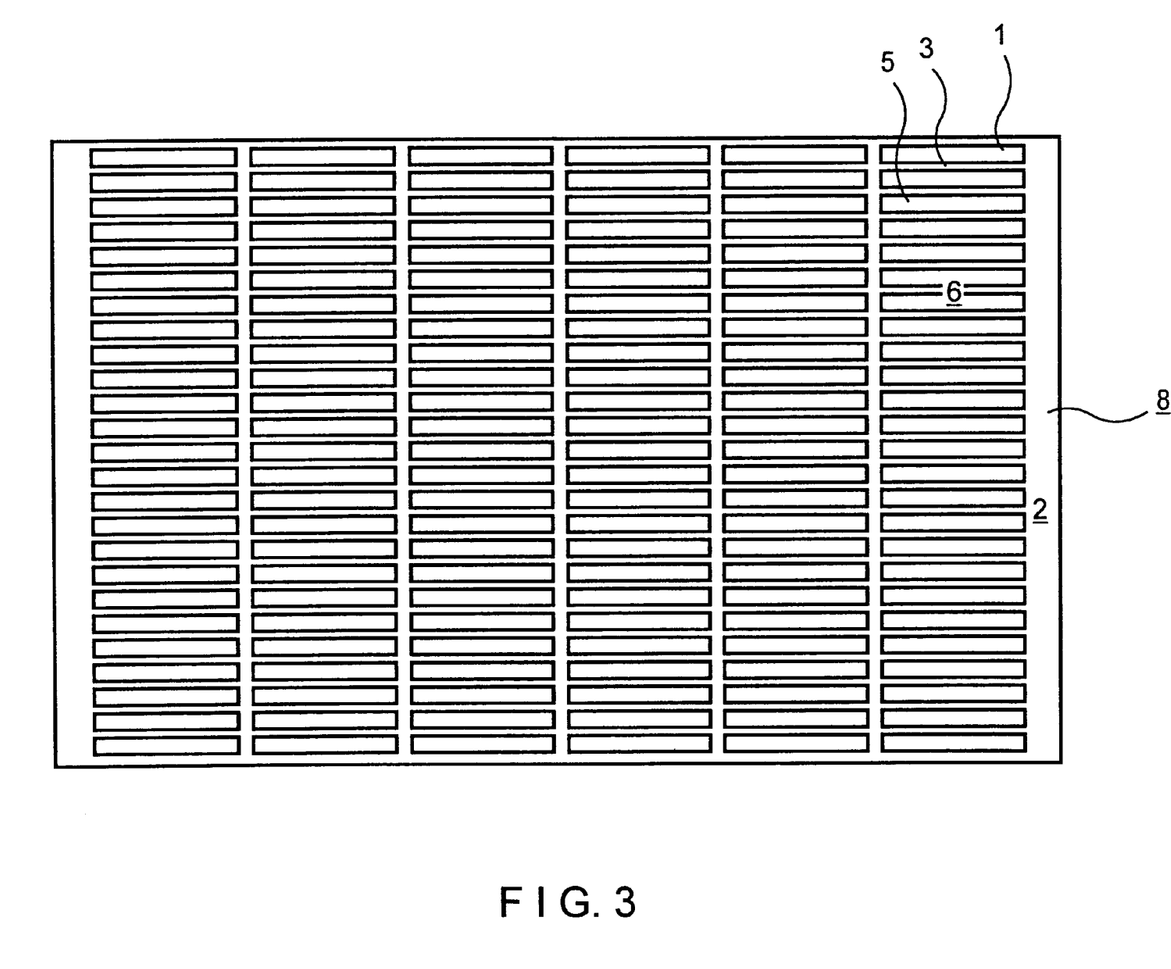
FIG. 3 is a bottom view of the unit shown in FIG. 2.

FIG. 3 shows a cut-away portion from a view of the unit shown in FIG. 2 from below. Slots 5 of slotted mask 3 are always arranged within fold openings 6 between fold backs 4. In this exemplary embodiment, the ratio of the width of slots 5 and the width of fold openings 6 amounts to 0.8.

Figure 4:
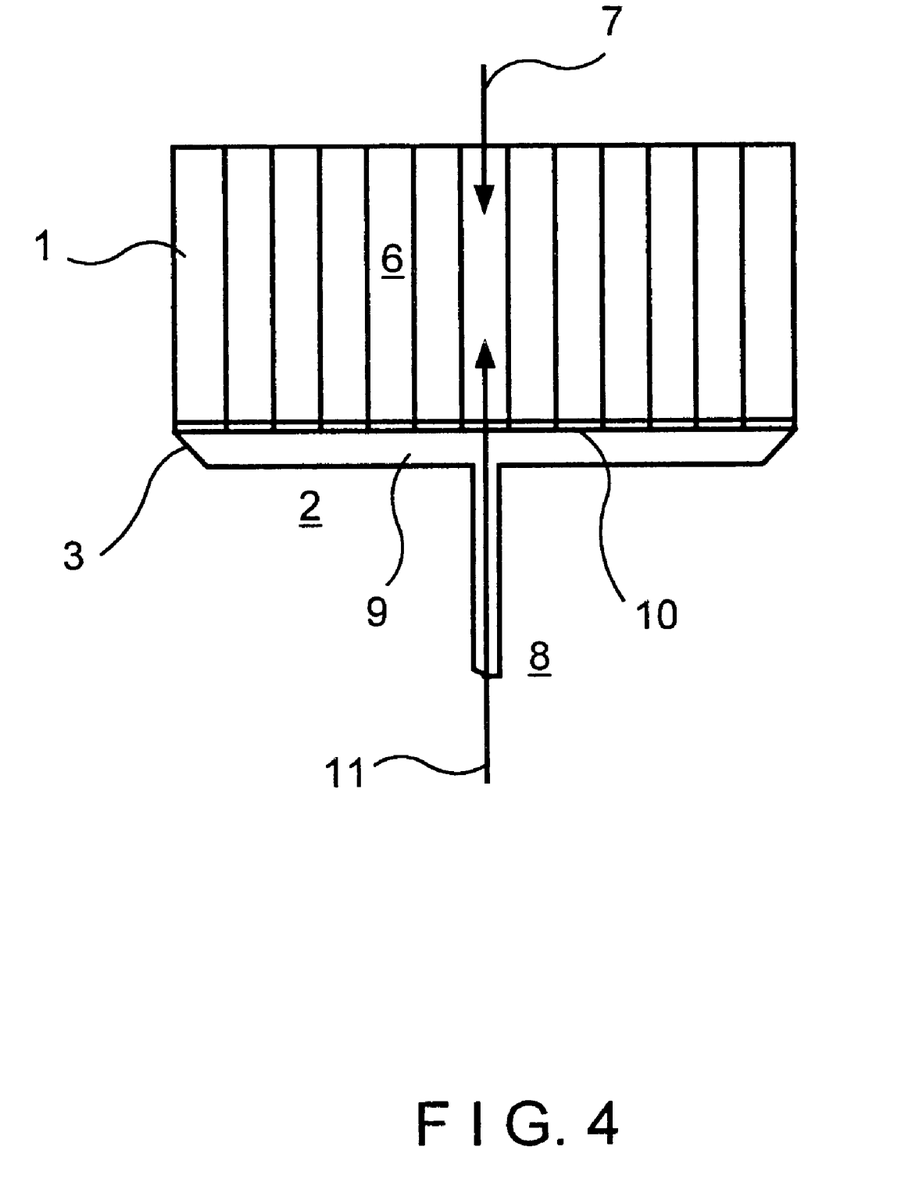
FIG. 4 is a schematic longitudinal section through the filter element.
Figure 5:
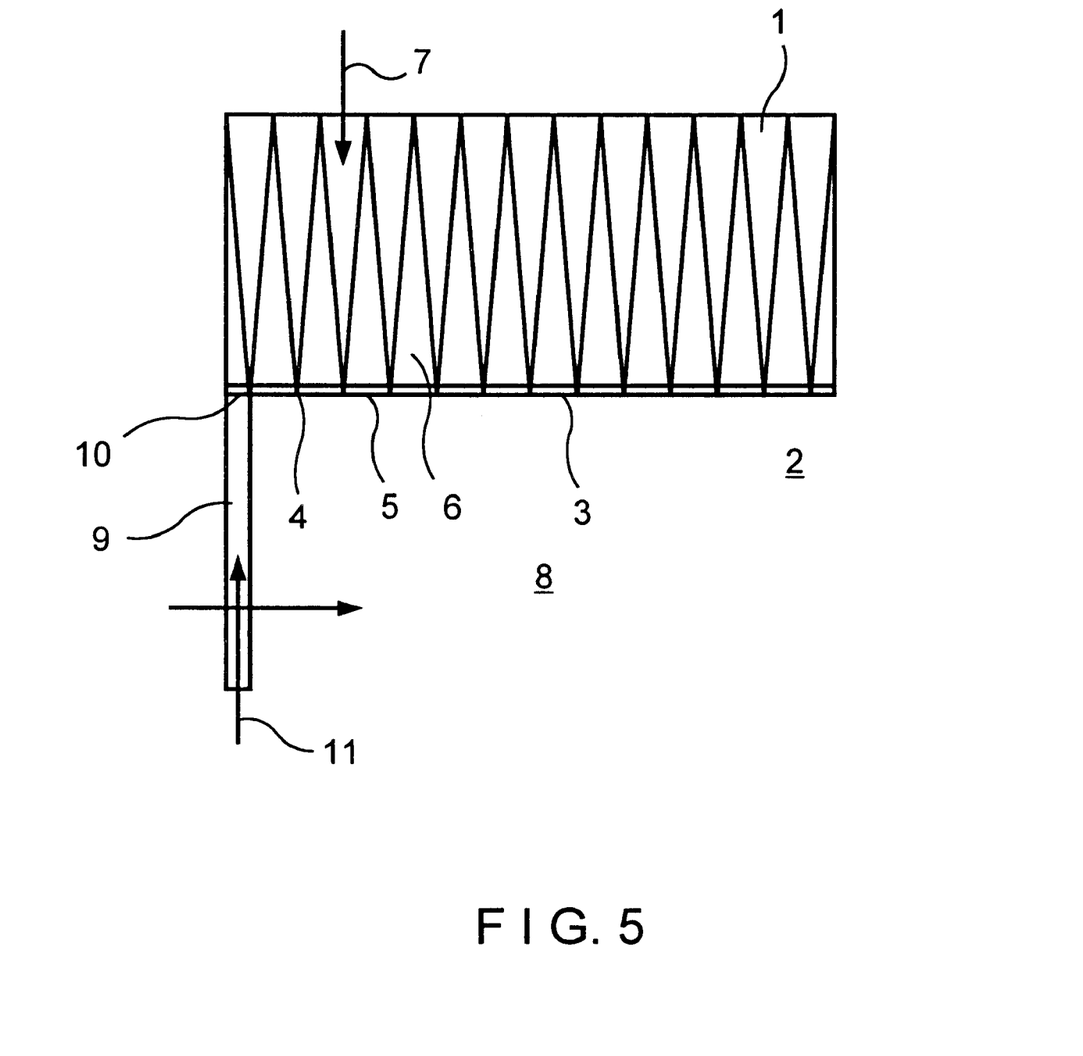
FIG. 5 is a cross-section through the filter element.

FIG. 4 shows a longitudinal section and FIG. 5 shows a crosssection through the unit shown in FIG. 2. An airjet housing 9 which can be charged with compressed air, is placed in airtight relationship with the boundary edge of its air exit 10 on slotted mask 3 and sealingly surrounds slot 5 of slotted mask 3, as can also be seen in FIG. 5. The compressed air 11 is applied opposite to air-filtering direction 7 through air jet housing 9 and the filter material bordering fold openings 6. Air jet housing 9 travels across slotted mask 3 discontinuously (i.e., fold-by-fold) in this exemplary embodiment. The suspended matter particles filtered out of the gaseous medium are blown out discontinuously (i.e., fold-by-fold) from the material of accordion fold pack 1 opposite to air-filtering direction 7.

Figure 6:
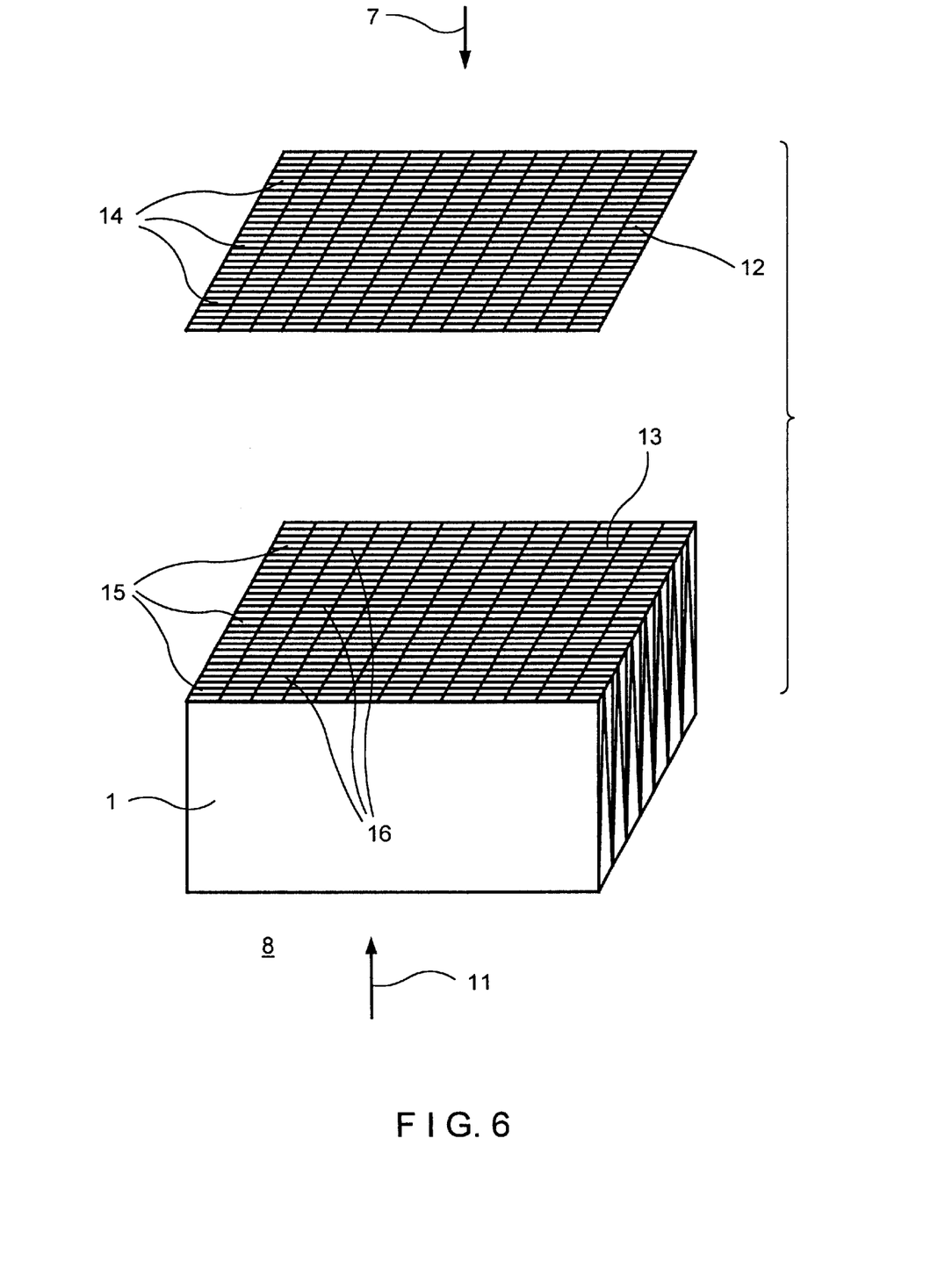
FIG. 6 is an exploded, perspective view in which the accordion fold pack and a second slotted mask for the oncoming-flow side are shown separately from one another.

FIG. 6 shows a further embodiment of the invention from the oncoming-flow side showing accordion fold pack 1 and a second slotted mask 12 in perspective. Accordion fold pack 1 comprises a formed fabric and the slotted mask 12 may comprise polystyrene of a thickness of 1 to 1.5 mm. Slotted mask 12 is arranged on the oncoming-flow side 13 of accordion fold pack 1 and has a geometry, including slots 14, adapted to the folds of accordion fold pack 1. Fold backs 15 of the oncoming-flow side of the accordion fold pack 1 are arranged between fold openings 16, the fold backs each being cemented sealingly to slotted mask 12. The air-filtering direction is indicated by reference number 7. The clean-air side of the filter element is indicated by reference number 8.

Figure 7:
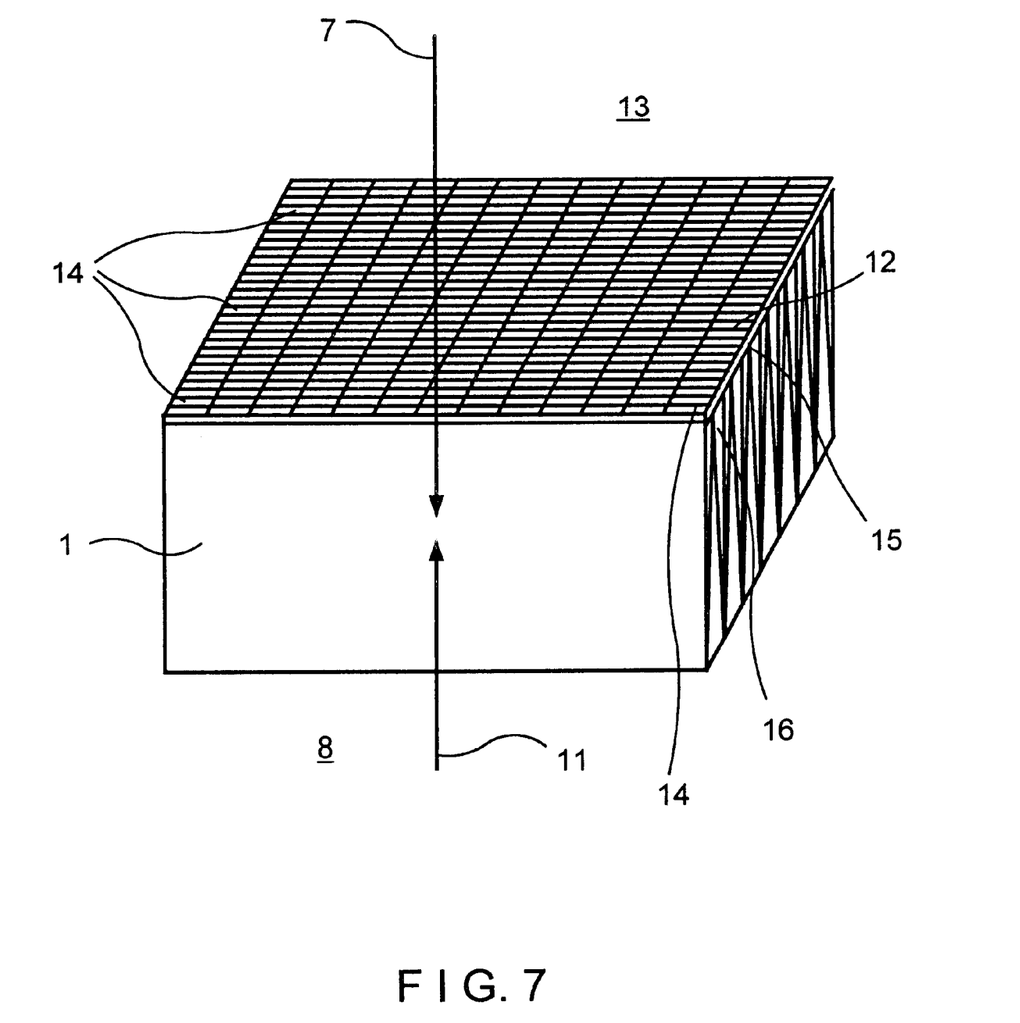
FIG. 7 is a perspective view of the accordion fold pack and second slotted mask joined together.
Figure 8:
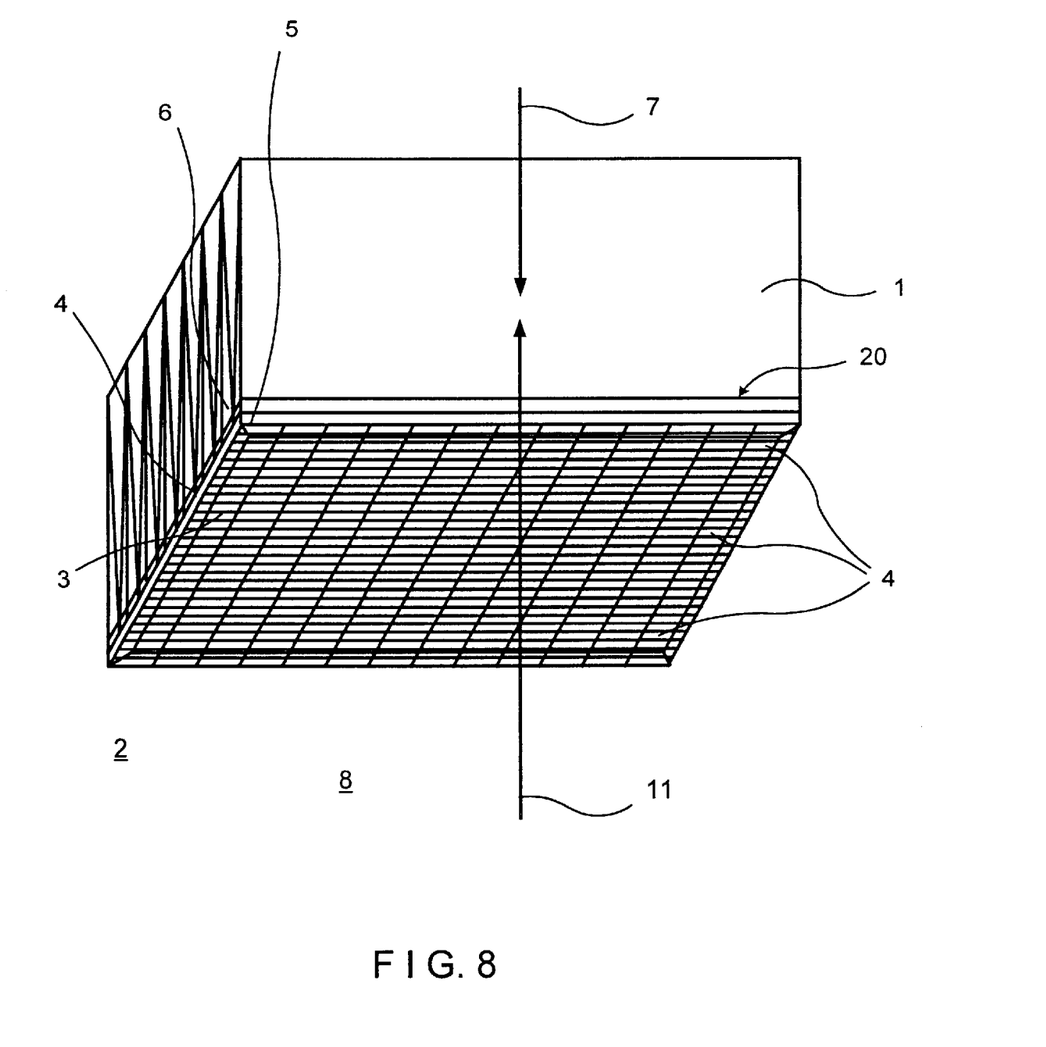
FIG. 8 is a perspective view of the accordian fold pack, slotted mask, and frame.

FIG. 7 shows the preassembled unit comprising accordion fold pack 1 and slotted mask 12. Slotted mask 12 is arranged on the oncoming-flow side of the filter element. As shown in FIG. 8, the slotted mask 3 may be enclosed by a frame 20 which completely covers the filter element. The slotted mask 3 may advantageously extend over the frame 20 of the filter element, so that a plane surface is formed, across which, for example, a cleaning rod may pass.

What is claimed is:

1. A filter element, that can be sealingly secured in position in a filter housing, comprising:
   an accordion fold pack having fold backs and a flow-offside and;
   a latticed protective mask, the protective mask being sealingly joined to all the fold backs of accordion fold pack on the flow-offside along substantially an entire length of the fold backs so that the fold backs are sealing joined to the protective mask along substantially their entire length.

2. The filter element according to claim 1, wherein the protective mask is constructed as a slotted mask.

3. The filter element according to claim 1, wherein the protective mask and fold backs are cemented to one another.

4. The filter element according to claim 1, wherein the protective mask has slots, and the accordion fold pack has fold openings between the fold backs, the width of the slots being no greater than the width of the fold openings.

5. The filter element according to claim 4, wherein a ratio of the width of slots and the width of fold openings is 0.6 to 1.

6. The filter element according to claim 1, wherein the protective mask comprises a rustproof, metallic material.

7. The filter element according to claim 1, wherein the protective mask comprises a non-metallic material.

8. The filter element according to claim 7, wherein the protective mask comprises a woven fabric.

9. The filter element according to claim 1 wherein the accordion fold pack and the protective mask form a unit which can be preassembled.

10. The filter element according to claim 1, wherein the protective mask is enclosed by a frame which completely covers the filter element.

11. The filter element according to claim 1, further comprising a second latticed protective mask and wherein the accordion fold pack further comprises an oncoming-flow side, the oncoming-flow side of the accordion fold pack being covered by the second protective mask, the second protective mask being sealingly joined to all fold backs of accordion fold pack on the oncoming-flow side, the second protective mask being constructed corresponding to the protective mask on the flow-off side.

12. The filter element according to claim 2, wherein the protective mask and fold backs are cemented to one another.

13. The filter element according to claim 1, further comprising:
   an air jet housing, wherein the protective mask has a plurality of slots which correspond to the fold backs of the accordion fold pack, the air jet housing adapted to detachably sealably cover one of the plurality of slots of the protective mask on the flow-off side, and wherein a pressurized fluid may be applied to the air jet housing from the flow-off side to thereby clean a fold back associated with the one of the plurality of slots, the air jet housing being movable to sealingly cover a different one of the plurality of slots of the protective mask.

14. A filter element, that can be sealingly secured in position in a filter housing, comprising:
   an accordion fold pack having fold backs and a flow-offside, said fold backs being spaced a set distance from one another; and
   a protective mask having a lattice of slots, the protective mask being sealingly joined to the fold backs of accordion fold pack on the flow-off side along substantially an entire length of the fold backs so that the fold backs are sealingly joined to the protective mask along substantially their entire length.

15. A filter element as set forth in claim 14, wherein the slots have a width, and wherein the ratio of the width of the slots to the distance between adjacent fold backs is between 0.6 to 1.

16. A filter element as set forth in claim 15, wherein the slots have a width, and wherein the ratio of the width of the slots to the distance between adjacent fold backs is between 0.7 to 0.9.

* * * * *